April 8, 1958 R. C. DAVIS ET AL 2,830,285

STORAGE SYSTEM

Filed Oct. 18, 1955 6 Sheets-Sheet 1

INVENTORS: R. C. DAVIS
R. E. STAEHLER
BY [signature]
ATTORNEY

INVENTORS: R. C. DAVIS
R. E. STAEHLER
BY [signature]
ATTORNEY

April 8, 1958 R. C. DAVIS ET AL 2,830,285

STORAGE SYSTEM

Filed Oct. 18, 1955 6 Sheets-Sheet 3

INVENTORS R. C. DAVIS
R. E. STAEHLER

BY [signature]

ATTORNEY

INVENTORS R.C. DAVIS
R.E. STAEHLER
BY [signature]
ATTORNEY

INVENTORS: R. C. DAVIS
R. E. STAEHLER
BY [signature]
ATTORNEY

INVENTORS: R. C. DAVIS
R. E. STAEHLER
BY [signature]
ATTORNEY 2,830,285
Patented Apr. 8, 1958

2,830,285

STORAGE SYSTEM

Richard C. Davis, Great Neck, N. Y., and Robert E. Stachler, North Caldwell, N. J., assignors to Bell Telephone Laboratories, Incorporated, New York, N. Y., a corporation of New York Application October 18, 1955, Serial No. 541,195

35 Claims. (Cl. 340—174)

This invention relates to information storage systems and more particularly to such systems especially suitable for relatively permanent storage of large quantities of information.

For various applications it is desirable to have available a medium capable of storing large quantities of information which require change at relatively infrequent intervals. As the quantity of stored information increases, the size of the storage medium must be increased, or alternatively, the information stored on a medium having fixed dimensions must be packed more closely by reduction of the space allotted each individual portion or bit of information. Various storage systems in present use attempt to meet large capacity requirements by employing multiple reading devices, each having access to a fixed amount of the storage surface, and additionally by moving the storage surface across the path of the reading device in some fashion such as on a revolving drum. Such systems may prove costly from the standpoint of the additional circuit elements required for each reading device and are limited in access time by the speed with which the storage surface can be passed under the reading device to reach a desired bit of information.

Attempts have also been made to utilize the inverse process of moving the reading device across a stationary storage surface, and to this end various arrangements, employing a cathode ray tube, to scan an electron beam across a fixed storage surface have been explored.

In such arrangements, generally, the cathode ray tube comprises a luminescent screen or target and an electron gun for projecting a concentrated electron stream against the inner face of the screen. An input signal deflects the electron beam to a particular discrete area of the screen. Light emanating from the spot produced by the beam on the discrete area of the screen is focused by a suitable lens system upon a discrete area of the storage surface. A photosensitive device is positioned so as to receive the light passing through the storage surface and to convert it into electrical output signals.

Such an arrangement was utilized in the Mellon Optical System referred to in the article "A Survey of Digital Computer Memory Systems" by J. P. Eckert, Proceedings of the Institute of Radio Engineers, October 1953, at page 1404 and also in the article "Photographic Techniques for Information Storage" by King, Brown and Ridenour, Proceedings of the Institute of Radio Engineers, October 1953, page 1421.

Such a system permits a decided increase in speed of access over the moving surface type of store, but the system is limited in storage capacity by the amount of information which can be stored in the space limits fixed by the range of the cathode ray beam. Means are available for increasing the storage density on the available surface space, but this practice renders more acute the problem of achieving rapid and accurate positioning of the beam on a desired discrete area of the storage surface to assure readout of the proper information.

This difficulty may be appreciated when it is realized that to satisfy permanent store requirements in this type of system, the storage medium should provide discrete storage areas for writing information of the order of one million binary digits. The system must therefore be capable of generating distinct deflection voltages to position the electron beam of the cathode ray tube on the proper spots for reading the information from one million discrete areas, and this operation must be performed repeatedly over long periods of time at high speed and within narrow tolerance limits.

Satisfaction of the precise positioning requirements of high density storage by increasing the quantity and complexity of conventional positioning elements necessarily adds to the size and expense of the system and counterbalances any gain in usefulness which may be acquired. Again, even with extreme care in the design of the control equipment, reliability may decline through aging of the various elements over a period of time with consequent inaccuracies in the information read from the storage medium.

It is a general object of this invention to provide an improved storage system.

It is another object of this invention to improve the operation of beam storage systems and particularly to improve the accuracy and reliability of output signals read from such systems.

It is a further object of this invention to realize precise monitoring of the reading operation in a beam storage system and continuously correct errors in positioning of the reading beam.

It is a still further object of this invention to increase the speed of access, reading speed and storage capacity of a beam storage system.

These and other objects of the invention are attained in accordance with features of the invention by the combination of a plurality of photographic slides or plates facing the luminescent screen of a cathode ray tube. Optical means are provided therebetween to focus light emanating from the tube surface, due to the incident electron beam, simultaneously on a discrete area of the surface of each of the photographic slides. Photosensitive devices are positioned so as to receive light passing through each slide and thereafter to convert it into electrical impulses. Feedback paths emanate from certain of the photosensitive devices and connect, through various gating and other circuits, to the input circuit of the cathode ray tube.

In accordance with one feature of this invention, certain of the slides have information stored thereon in patterns of opaque and nonopaque spots representing one or the other of the binary digits. Each slide is coated with a suitable photoemulsion for highly concentrated storage of information to a density commensurate with inherent limitations of the device. Separate photosensitive devices behind each of these slides translate the light passing therethrough into electrical impulses which are gated into an output register. Thus a single position of the electron beam of the cathode ray tube can be made to read information simultaneously from a plurality of storage locations, thereby increasing the capacity of the store without necessitating a collateral increase in storage density.

It is therefore a feature of this invention that a binary information storage system utilize a light beam produced by the electron beam of a cathode ray tube to read information simultaneously from multiple storage plates.

It is a more specific feature of this invention that the reading beam be focused by a multiple lens system simultaneously on a plurality of photographic slides having information stored thereon, and having photosensitive devices positioned so as to receive light passing through certain of the slides and to convert it into electrical impulses in an output circuit.

In accordance with another feature of this invention, an optical feedback system is utilized wherein the electron beam position advantageously is monitored and driven to the exact information address location desired, thereby obviating the need for complex initial deflection circuitry, and the system may be provided with conventional deflection circuitry for initial positioning of the electron beam. The light beam impinges each of the photographic storage slides at or near the desired location and simultaneously impinges other slides, designated positioning slides. Light passing through the positioning slides activates photomultiplier tubes to transmit signals in a feedback circuit. If the beam is not striking the exact spot on the respective storage plates desired, the signals in the feedback circuit will so indicate and will activate means to reposition the beam to the desired location.

One of the positioning slides is provided with alternate opaque and nonopaque horizontal bands, and another is provided with similar bands in a vertical direction. Photosensitive devices positioned behind these slides are connected to the horizontal and vertical input address circuits, respectively, of the cathode ray tube through differential amplifiers. Comparisons are made by the differential amplifiers between electrical signals received via these positioning slides and a test signal. If the signals in each coordinate feedback path agree with the respective test signals, the beam is properly positioned on the dividing line between an opaque and a nonopaque band on each positioning slide, and no correcting signal is applied to the input circuit. If they disagree in either coordinate feedback path, the beam is impinging an opaque band or a nonopaque band of the address positioning slide for that coordinate, thus producing a weaker or stronger signal respectively than the test signal. The comparisons of these signals with the fixed test signals in the differential amplifiers in each of the feedback paths will produce correcting signals which are fed to the deflection circuits and combined with the initial address signal so as to guide the beam to the proper address position. The direction of correction is determined by the type of band on which the beam impinges; i. e., light through a nonopaque band will drive the beam in one direction and light through an opaque band will drive the beam in the opposite direction, both serving to move the beam toward the dividing line between them.

It is thus apparent that a beam having a greater error of incidence than one band width would not reach the correct address position. In accordance with another aspect of this invention, an additional photographic slide, designated the final address check slide, is provided for this contingency. This slide has information in the form of opaque and nonopaque spots stored thereon serving to identify each information address location of the storage slides by a group of bits or a binary word unique to each particular information address location. The input signal to the cathode ray tube is compared to an electrical signal transmitted by a photoelectron multiplier positioned behind this address check slide when the beam has been properly positioned by the operation involving the positioning slides. A favorable comparison will produce a zero feedback signal and the output information held in the output register will be released therefrom. If the check information disagrees with the input information, the difference will be calculated in this feedback path and signals transmitted to the output address circuit indicating the exact amount that the beam is displaced from the proper address location so as to reposition the beam to the proper address. It will also direct the cancellation of the information stored in the output register from the previous erroneous positioning.

It is therefore another feature of this invention that certain of the slides be provided with alternate opaque and nonopaque positioning bars, and that photosensitive devices positioned so as to receive the light passing through these slides be connected through positioning feedback paths to the deflection plates of the cathode ray tube.

It is a more particular feature of this invention that a differential amplifier be included in each of the positioning feedback paths and the feedback signals be compared with a test signal therein, the resultant being transmitted to the deflection plates of the cathode ray tube.

It is another feature of this invention that one of the slides be provided with opaque and nonopaque spots defining each address location on the information storage slides, and a photosensitive device positioned so as to receive the light passing through this check slide be connected through a feedback path to the deflection plates of the cathode ray tube.

It is still another feature of this invention that the output signal paths and feedback paths be gated to prevent transmission of an output signal other than the desired signal.

A complete understanding of this invention and of the above-noted and other features thereof may be gained from consideration of the following detailed description and the accompanying drawing in which.

Figure 1:
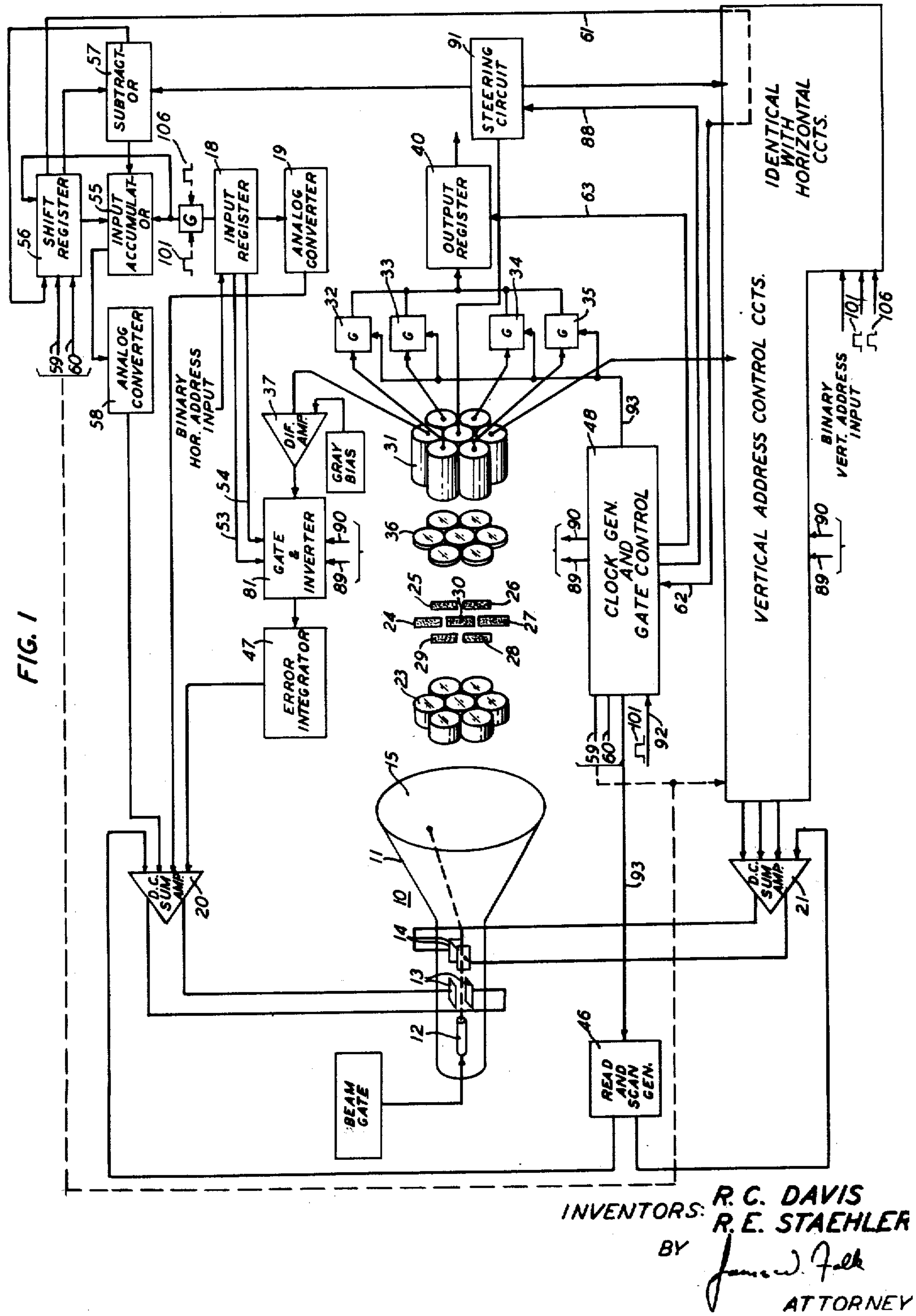
Fig. 1 is a representation, mainly in block diagram form, of one specific illustrative embodiment of this invention.

Referring now to the drawing, Fig. 1 is a schematic diagram, mainly in block form, of one specific illustrative embodiment of a storage system in accordance with this invention. As there depicted, the system contains a cathode ray tube, shown generally at 10, comprising an evacuated enclosing vessel 11 having at one end an electron gun 12. The electron gun 12 produces a concentrated electron beam which is projected centrally between two pairs of deflection plates 13 and 14 mounted in space quadrature. The electron beam is projected against a target surface 15 which forms the face of the cathode ray tube and is coated with a luminescent material or phosphor. The deflection plates 13 and 14, which are energized from horizontal and vertical deflection circuits through summing amplifiers 20 and 21, respectively, serve to deflect the electron beam to a desired discrete area of surface 15. The horizontal deflection circuitry is identical to the circuitry for vertical deflection so that a description of the horizontal circuitry will suffice to describe the structure and operation of this specific embodiment of this invention.

Figure 4:
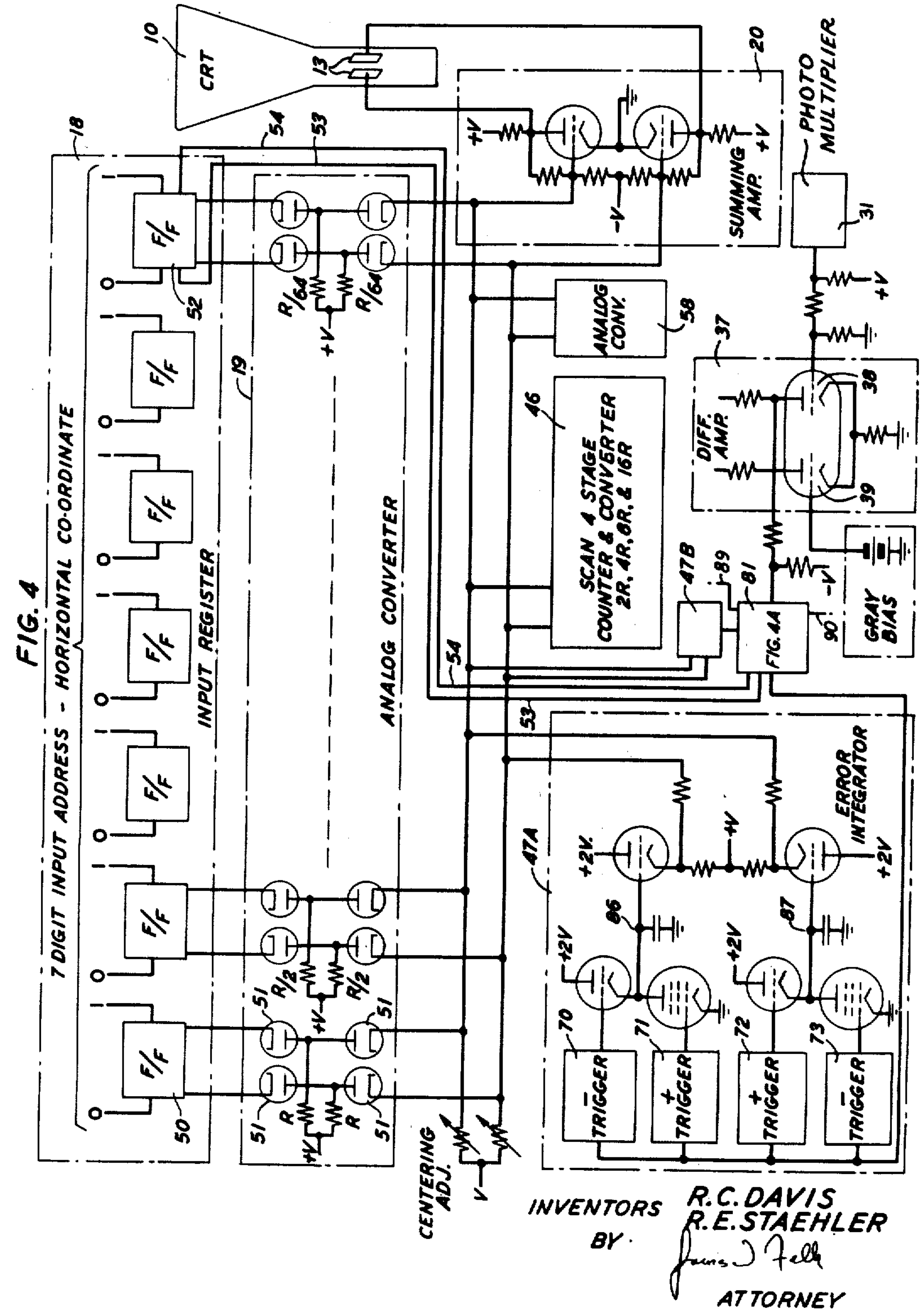
Fig. 4 is a representation, mainly in schematic form, showing elements effecting the deflection of the cathode ray tube beam.

Binary information is fed into an input register 18 indicating a particular address or start location of binary information to be read out of the system. Simultaneously an external start pulse 101 activates the clock generator and gate control 48 and gates in the address control circuitry. In this specific illustrative embodiment of this invention the input information for address location in each coordinate consists of seven binary digits. Thus the input register 18 and its associated analog converter 19 may be of any of a number of circuits capable of generating analog representations on application thereto of simultaneous input pulses; for example, as best shown in Fig. 4, input register 18 may comprise a series of bistable flip-flop units 50 arranged to feed simultaneously through diodes 51 of analog converter 19, which is capable of passing analog stepped amounts of current to summing amplifiers 20 and 21 in the respective coordinate deflection circuits. Amplifiers 20 and 21 supply output voltages to the deflection plates 13 and 14 representing a summation of analog values in each deflection circuit as described further below.

The electron beam is deflected in accordance with the voltages applied to the deflection plates 13 and 14 so that it impinges a discrete area of the surface 15 and produces a spot of light thereat. A lens system 23 comprising seven individual lenses is positioned behind surface 15 to focus the resultant light on seven slides 24 through 30. Any arrangement of slides may be utilized so long as it is consistent with output connections from pickup means associated with each slide.

Figure 2:
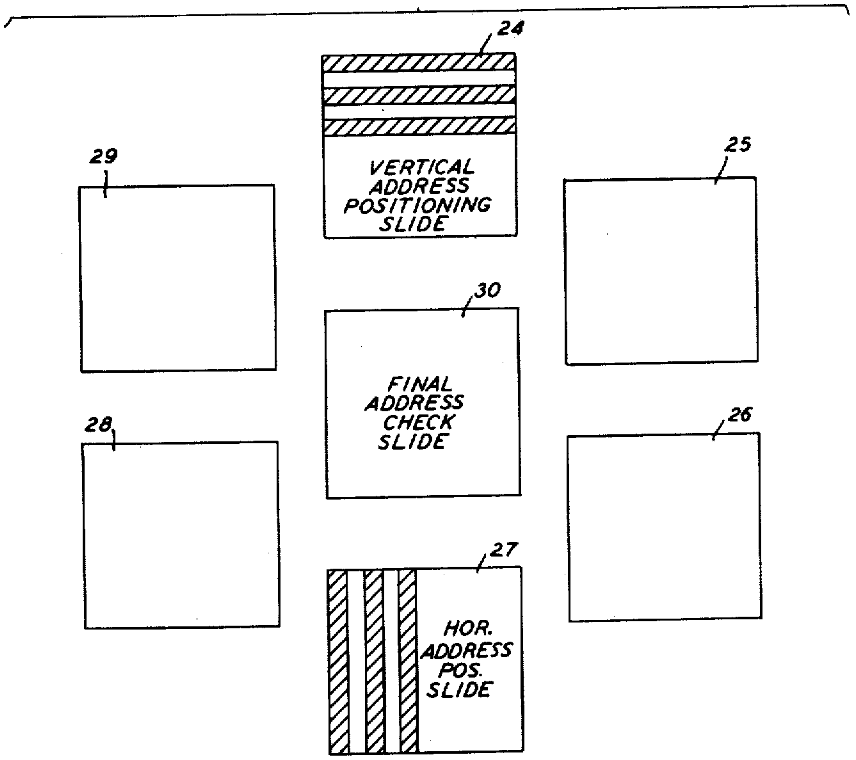
Fig. 2 is a diagram of the photographic slides employed in specific embodiments of this invention drawn to a larger scale than that used in Fig. 1 to illustrate the relative positions of the slides and the arrangement of opaque and nonopaque areas on the positioning slides.
Figure 3A:
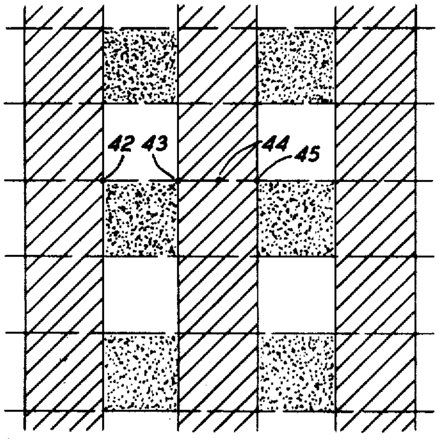
Figs. 3A, 3B, 3C and 3D are diagrams, to an enlarged scale, of portions of each type of the slides of Fig. 2, superimposed on one another to illustrate the address locations more clearly.
Figure 3B:
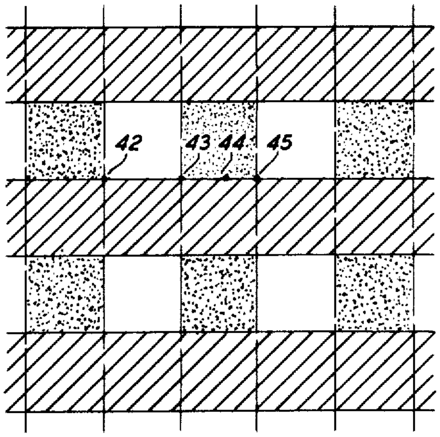
Figure 3C:
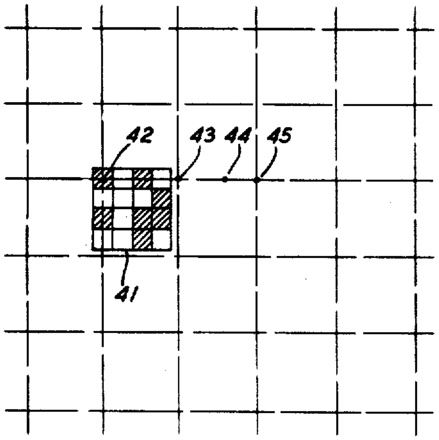
Figure 3D:
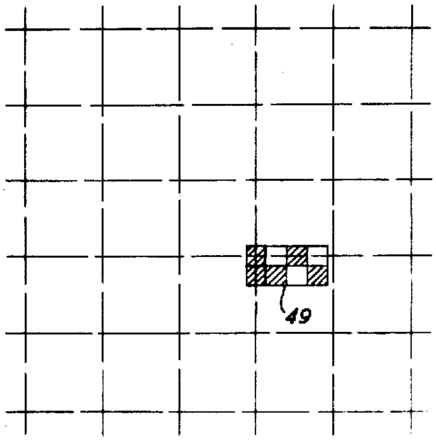

Fig. 2 shows a construction of these slides which may advantageously be employed in embodiments of this invention. A coating of a suitable photoemulsion is applied to a transparent base, such as a glass plate, and patterns of opaque and nonopaque areas are formed in the emulsion of slides 25, 26, 28 and 29, by exposure to a cathode ray beam in accordance with information which it is desired to store in the system. An example of a binary word which may be stored in one of the information slides is shown at 41, Fig. 3C, considerably enlarged from actual size. This word is composed of sixteen binary digits or bits, each bit being an opaque or nonopaque spot in the photoemulsion of an information storage slide, although any array may be utilized consistent with the scanning means employed. In this example, point 42 is the initial address point of the word 41 or the point to which the light beam is directed when it is desired to read out this particular word.

The storage capacity of each of the information storage slides is limited by the density of storage consistent with the ability of the light beam to recognize each discrete area independently of those adjacent thereto. However, the employment of multiple focusing elements consistent with this invention permits the storage of binary information on a plurality of slides, the beam being focused simultaneously on corresponding positions of each slide. Thus slides 25, 26, 28 and 29 in Figs. 1 and 2 each have binary information stored thereon, quadrupling the capacity of the store.

With the light beam focused on a particular address location of each of the slides 25, 26, 28 and 29, light passing through these locations will be focused by converging lenses 36 upon photoelectron multipliers 31, which may comprise a phototube and amplifier arrangement, a lens and photoelectron multiplier being individual to each of the slides. The photoelectron multipliers will transform the received light into electrical impulses which are delivered to gates 32, 33, 34 and 35. These gates may be arranged so that signals through one gate are passed to output register 40 while signals through the other three gates are blocked. In this fashion information from only one slide is read out.

Parallel readout may also be employed whereby a portion of each word is stored on each of the information storage plates in corresponding discrete areas of each slide. Thus signals simultaneously reaching the individual gates present consecutive digits of a binary word to be read out. The gates 32, 33, 34 and 35 in this situation would merely act to delay output signals so as to permit all of the signals transmitted simultaneously thereto to pass consecutively to the output register 40.

The output register 40 will retain the output information until its accuracy has been checked by means described hereinaftre. If the checking apparatus indicates that incorrect information is being stored in the output register 40, it will, in effect, cancel such information, cause the correct information to be read therein and, when the correct information is present, permit its being read out of the output register 40.

Slides 24 and 27, as best in Fig. 2, have alternate opaque and nonopaque lines or bars lying parallel to one another across the surfaces of the slides. Slide 24, designated the vertical address positioning slide, has the alternate bars arranged horizontally while slide 27, designated the horizontal address positioning slide, has the alternate bars arranged vertically. Upon initial deflection of the cathode ray tube electron beam to an address position to begin readout of desired information, the resultant light beam is focused simultaneously on corresponding discrete areas of each of the information storage slides 25, 26, 28 and 29 and the address positioning slides 24 and 27. If the incident beam is properly positioned on the desired address position of the information storage slides, it will also be centered at the intersection between an opaque and a nonopaque band on each of the address positioning slides.

This condition is best illustrated in Fig. 3 wherein the address positioning slides and information storage slides are depicted superimposed on one another. Separate rays of the light beam are focused simultaneously on the same relative position of each of the slides, so that the effect is equivalent to focusing a single ray on all of the slides superimposed on one another as shown in various stages in Fig. 3. Fig. 3A shows a portion of the horizontal address positioning slide 27 (solid lines) superimposed on the vertical address positioning slide 24 (dotted lines) to illustrate the relative positions of address points such as 42, 43 and 45 on the band intersections of each of these slides. Fig. 3B shows the inverse of Fig. 3A. Fig. 3C shows a binary word 41 of one of the information storage slides superimposed on the framework formed by the intersections of the portions of the positioning slides shown in Figs. 3A and 3B. Thus the discrete area representing the first binary digit of the word 41 can be considered to lie on an intersection 42 between opaque and nonopaque bars of each of the address positioning slides; viz., the address position for the word 41. The width of each positioning bar of Figs. 3A and 3B matches the dimensions of each binary word stored on the information storage slides so that each intersection of vertical and horizontal bars in Figs. 3A and 3B represents an address position for a binary word.

With the light beam impinging at a proper address location of the information storage slides, light will strike an intersection between an opaque and nonopaque bar on each of the address positioning slides which will block one half of the beam in an opaque bar and pass the other half of the beam through a nonopaque bar. Electrical signals produced by the photoelectron multipliers 31, positioned so as to have the light passing through the positioning slides 24 and 27 focused thereon by lenses 36, are transmitted to differential amplifiers in the horizontal and vertical address control circuitry such as 37 in Fig. 1 in the horizontal address control circuitry. These amplifiers serve to compare the electrical signals delivered thereto with a reference signal voltage designated a gray reference. The input signal and the gray reference are placed on grids 38 and 39, Fig. 4, respectively, of a twin triode tube which is arranged to transmit a signal indicating the difference between the applied signals. If the applied signals are of equal strength, no "initial position error" signal will be transmitted by amplifier 37.

If, however, the input signal is less than the gray reference, caused by the majority of the light beam falling on an opaque band of the horizontal address check slide, a voltage of one polarity will appear in the output of the differential amplifier 37. Similarly, an output signal of greater strength than the gray reference, caused by the majority of the light beam impinging a nonopaque band of the horizontal address check slide, will result in the appearance in the output of differential amplifier 37 of a voltage opposite in polarity to the previously described signal.

Initial position error signals emanating from the differential amplifier 37 in the horizontal control circuit are fed to an error integrator 47 through an inverter and gate circuit 81 described later herein. The error integrator 47 comprises two identical networks 47A and 47B (Fig. 4) which have trigger circuits, such as 70, 71, 72 and 73 in 47A, at the input end thereof. Triggers 70 and 73, designated as negative in Fig. 4, will conduct upon receipt of a critical magnitude signal of negative polarity while triggers 71 and 72 will conduct upon receipt of a critical magnitude signal of positive polarity. The triggers will conduct as long as the applied signal of the proper polarity exceeds a threshold value. The trigger circuits in each error integrator network 47A and 47B are oppositely arranged so that an input signal of one polarity will be inverted by one of the error integrator circuits but will retain its original polarity in passing through the other error integrator circuit. The inverse would be true of an input signal of opposite polarity. The output signals are passed to the summing amplifier 20 in the horizontal deflection circuit for addition to the input address signals. In this fashion the electron beam is deflected so as to drive the light beam toward the intersection between an opaque and nonopaque band of the horizontal address positioning slide 24. Thus with a majority of the incident light beam falling in an opaque band of a positioning slide, the consequent error correction signals will drive the beam in one direction toward an intersection with a nonopaque band. Similarly if a majority of the beam falls on a nonopaque band the error correction signals will serve to drive the beam in the opposite direction toward an intersection with an opaque band.

A beam erroneously focused on an opaque or a nonopaque band of one of the address positioning slides necessarily lies between two band intersections of that slide. Since each band intersection represents the coordinate of two desired check locations, means should be included to drive the beam in either direction to the desired band intersection. A beam falling in an opaque area of the horizontal address positioning slide, at point 44 of Fig. 3A for example, must be driven to the left if 43 is the desired address location and to the right if 45 is the desired address location.

In accordance with another aspect of this invention, the least significant digit of the input address information for each coordinate may be utilized for this purpose. This digit identifies each address location as odd or even. If the address location is odd or even in the horizontal coordinate, the desired band intersection of the horizontal address positioning slide will be odd or even respectively. Thus, in this example, point 44 falls between odd intersection 43 and even intersection 45, and the beam must be driven to the left to reach the odd intersection and to the right to reach the even intersection.

Figure 4A:
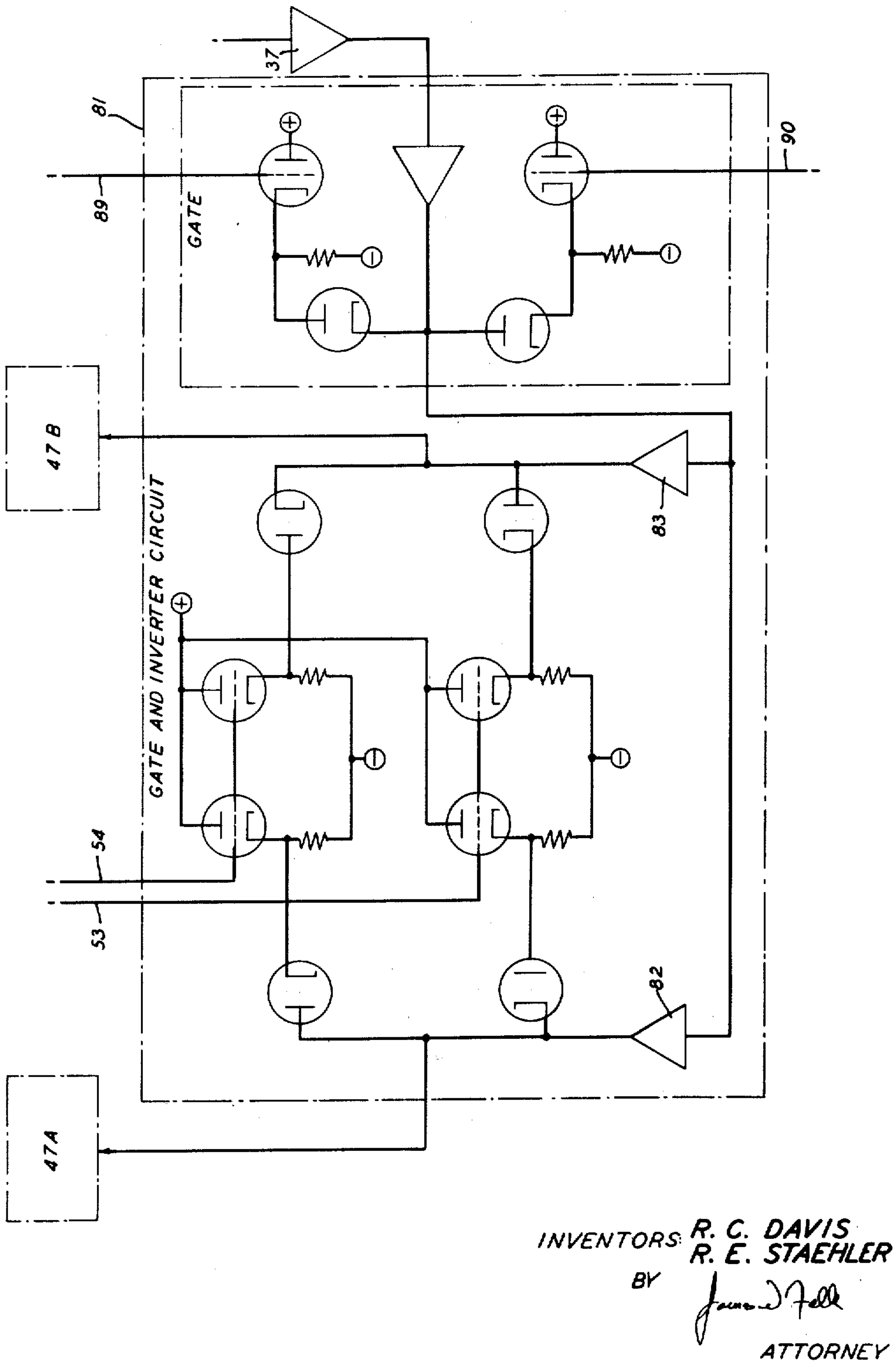
Fig. 4A is a more detailed representation of a gate and inverter circuit shown in block form in Fig. 4.

The flip-flop circuit 52, Fig. 4, stores the least significant digit in the input register 18 and has each of its triodes connected to opposite sides of a gate and inverter circuit 81, as best shown in Fig. 4A, over leads 53 and 54, respectively. Pulses over leads 89 and 90 from the clock generator and gate control 48 activate the gate in inverter and gate circuit 81 at this time to pass an amplified signal from differential amplifier 37. The signal from the differential amplifier 37 is applied to the error integrator networks 47A and 47B through amplifiers 82 and 83 respectively to operate triggers in either network. Dependent upon the state of the flip-flop 52, leads 53 or 54 will carry signals of one or the other pair of equal and opposite polarities to the inverter and gate circuit 81, permitting one or the other of the pairs of diodes in the inverter to conduct. This in turn results in the appearance of a low impedance path across one or the other of amplifiers 82 or 83, causing a decrease in its output. As a consequence only one or the other of amplifiers 82 or 83 is able to drive its corresponding error integrator circuit 47A or 47B. With the least significant digit in its "zero" or even state, for example, lead 54 will carry a positive signal; lead 53, a negative signal, thereby causing a decrease in magnitude of the signal applied to error integrator 47B. The triggers of network 47A will conduct, if the error is in excess of a predetermined minimum allowable amount, in accordance with the polarities noted in Fig. 4. Condensers 86 and 87 will charge in opposite directions and drive summing amplifier 20 to deflect the beam, erroneously focused on point 44, toward even intersection 45. If the next input address reverses the least significant digit to its "one" or odd state, a signal from differential amplifier 37 will activate only the error integrator 47B. The resultant signals from summing amplifier 20 would drive the beam, focused erroneously on the same point 44, toward odd intersection 43.

When the desired intersection in the horizontal coordinate is reached in this fashion, the gray reference signal of the differential amplifier 37 matches the input signal from its associated photoelectron multiplier 31 and the signal arriving at the error integrator 47B, Fig. 4, falls below the predetermined minimum allowable amount required to cause its triggers to operate. This terminates the charging of condensers 86 and 87 and their accumulated charge maintains the output of amplifier 20 at the level corresponding to the desired intersection. When this position is reached, scanning circuit 46, Fig. 1, is activated via lead 93 by the clock generator and gate control circuit 48 to move the beam across the information slides to read the desired information into the output register 40. The scanning circuit 46 may comprise a chain of binary counter units successively operated to produce analog stepped representations for application to the deflection plates 13 and 14 through summing amplifiers 20 and 21.

If the initial positioning error is greater than the width of a positioning band of one of the address positioning slides, it may be seen that the previously described positioning circuits will drive the beam farther away from the correct address position. Assume, for example, that point 42, Fig. 3, is the desired address position (even in horizontal coordinate) and that initial positioning causes the beam to impinge at point 44. Rather than drive the beam toward the address position 42, the error signal from the opaque area of the horizontal positioning slide, Fig. 3A, would drive the beam toward point 45, the nearest even band intersection.

The seventh slide 30, designated the output address check slide, provides for such a contingency. Written on this slide, starting at each address location, is a binary word defining that address location in both coordinates. An example of such a word is shown as 49 in Fig. 3D. It may be the same binary word used initially to deflect the beam of the cathode ray tube to that particular address location, or a lesser number of digits, starting with the least significant digit of each address word, may suffice. When the light beam is positioned exactly on an address location through the efforts of the positioning feedback circuits described hereinbefore, the stored information is scanned and read out of the storage slides 25, 26, 28 and 29. The address location of this information is read out of the final address check slide 30 at the same time, since the light beam impinges corresponding discrete areas of each of the slides simultaneously. One of the photoelectron multipliers 31 translates the light pulses focused on it by lens 30 from the final address check slide 30 into electrical impulses which are fed into steering circuit 91. Steering circuit 91 consists of gates controlled by the clock generator and gate control circuit 48 over lead 88 in such a manner that information on slide 30 pertaining to the horizontal and vertical addresses is fed through the corresponding horizontal and vertical address control circuits for comparison with the input address information in the respective coordinates.

Figure 5:
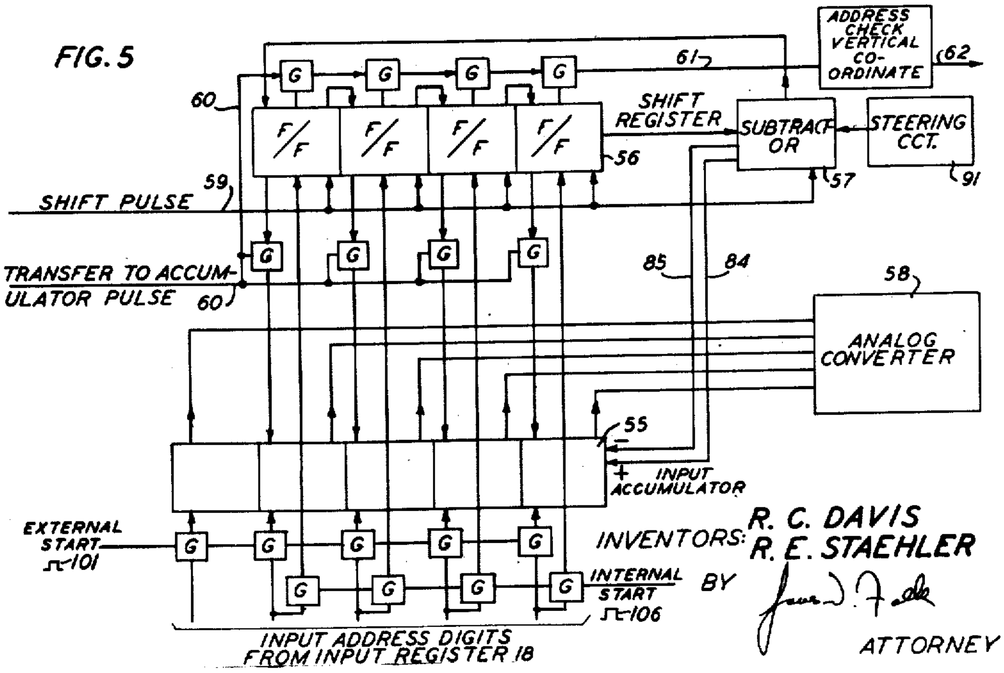
Fig. 5 is a representation in block diagram form enlarging a portion of Fig. 1 to illustrate the operation of the final address check feedback circuit.

The means for making this comparison may comprise any of a number of circuit arrangements of flip-flops and gates to subtract the final address check word from the input address word; for example, an arrangement as shown in Fig. 5 may be utilized. In this arrangement the input address digits are transmitted, at the time of the external start pulse on lead 92, from the input register 18 to an accumulator 55 which is essentially a parallel ring counter arranged to add to its content each binary number transmitted to it. The four least significant digits of the input address, which are sufficient to check the address location, are also placed in a shift register 56 consisting of one flip-flop circuit for each binary digit to be stored therein.

As the scan of the cathode ray tube 15 begins, pulses from the scanning generator 46 are delivered to the deflection plates and simultaneously shift pulses are delivered to each flip-flop of the shift register 56 over lead 59. The flip-flops in the shift register 56 are arranged so that upon receipt of each pulse from the clock generator and gate control circuit 48 over lead 59 the binary digits stored in the register 56 are in effect shifted one space to the right and the digit stored in the extreme right position of the shift register 56 is shifted out the right side into a serial subtractor 57. The serial subtractor 57 may comprise an arrangement of half adders, or groups of triodes and gates for performing necessary arithmetic computations. The first digit from the photoelectron multiplier 31 behind slide 30 arrives simultaneously in the subtractor 57 with the first digit from the shift register 56. The resultant difference is returned serially to the opposite end of the shift register 56 and progressively shifted to the right until all necessary comparisons of succeeding binary digits have been made and the shift register 56 holds a difference representing the amount of final address error. The sign of the error is transmitted to the accumulator over leads 84 and 85. The shift operation ceases at this point, and on receipt of a pulse from the clock generator 48 over lead 60, the content of the register 56 is algebraically added in parallel to the content of the accumulator 55. The resultant is fed in parallel through the analog converter circuit 58 to the summing amplifiers to originate a second trial positioning of the electron beam.

A path is also provided for transmission of the transfer pulse over lead 60 to gates in the shift register 56, lead 61, gates in the vertical address control shift register shown generally as address check vertical coordinate and lead 62 to the clock generator and gate control 48. The presence of a binary word representing a final address error in the shift register 56, or in its counterpart in the vertical address control circuits, will prevent the transfer pulse from reaching the clock generator and gate control 48.

The presence of a pulse on lead 62 at this time indicates that the information contained in the output register 40 is correct, and the same pulse prevents the occurrence of an internal start pulse 106 generated by the clock generator and gate control 48 at this time, to recycle the operation. Alternatively, the absence of a pulse on lead 62 at this time effectively cancels the information in output register 40 by permitting the clock generator and gate control to initiate a second positioning and reading cycle via an internal start pulse 106. The information in the output register may actually be erased by the new output information on the next cycle which replaces it, the old information in effect being read out without being applied to subsequent circuitry.

This final address check feedback system assures that output information is utilized only after it has been checked and found to be at the desired address. Since the number of binary digits necessary to check the address position may be less than the number of digits in the output information scanned from a particular address position, the final address position check is completed without delaying the reading operation.

The above-described operation for checking the final address position is employed when information is read from a single information storage slide or from all of the information storage slides in parallel. It is readily adaptable to parallel readout utilizing the final address check slide 30 as an additional information storage slide and distributing the binary information words over the five slides 25, 26, 28, 29 and 30 along with the address check word. For example, the address location of four of these five slides may contain one of the four digits necessary to define the horizontal address location. All of the binary information digits would be read out in parallel with sequential gating into the output register 40. The binary digits representing the address location would be gated sequentially into the check registers in each coordinate for final address checking.

The information stored in this system may comprise groups of binary digits of any size. The feedback check points need not be confined to address locations but may be distributed in various patterns, the frequency of occurrence being primarily dependent upon the inherent system inaccuracies.

Figure 6:
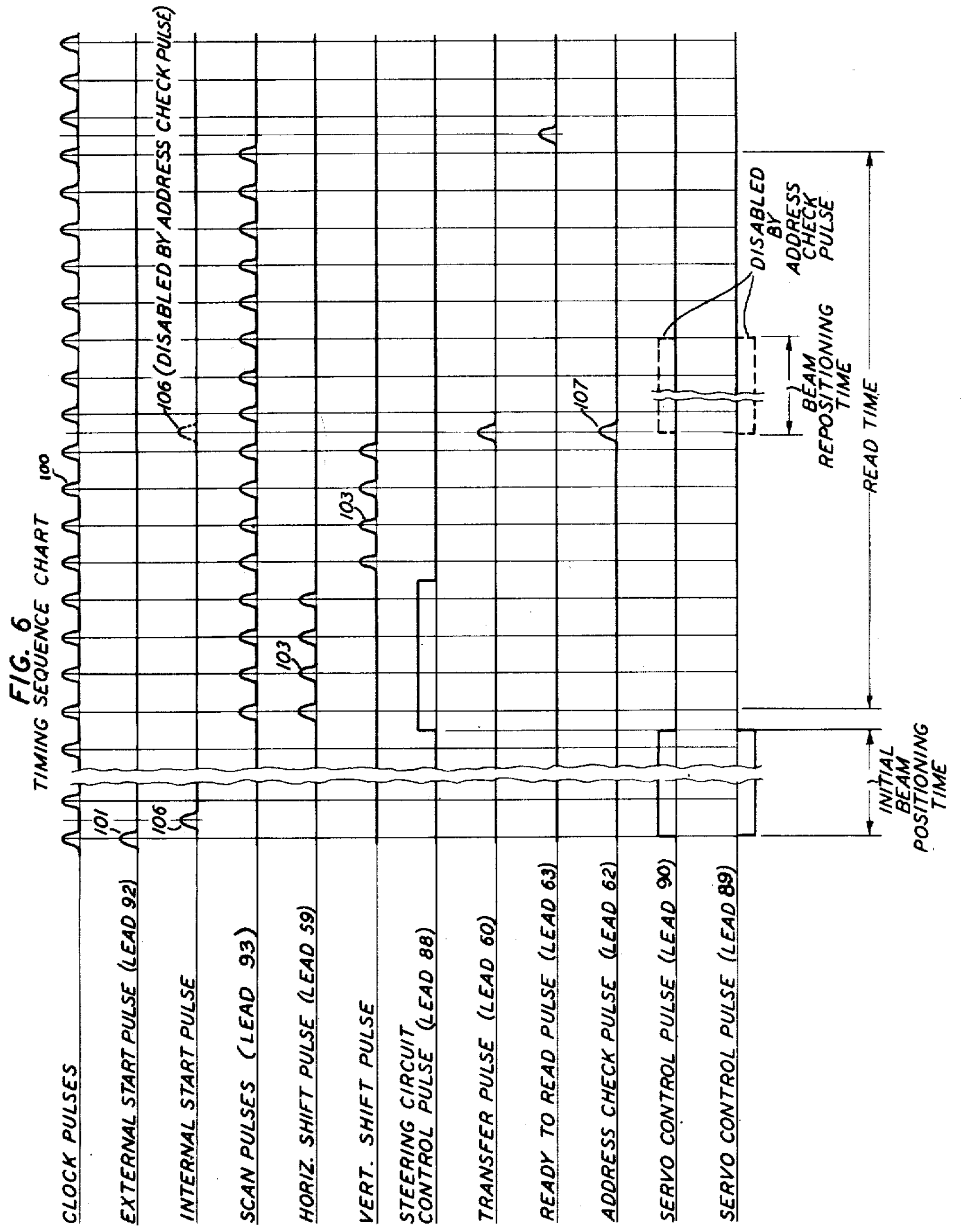
Fig. 6 is a timing sequence chart to illustrate the sequence of control operations in the specific illustrative embodiment depicted in Fig. 1.

A further appreciation of the operation of this specific embodiment of the invention and of the functioning of the clock generator and gate control circuits 48 can be obtained from Fig. 6, which is a timing sequence chart of various control and other pulses. The clock generator and gate control circuit 48 includes a synchronous pulse generator or clock, as is known in the art, which generates consecutive timed clock pulses 100. When it is desired to read out information, a start pulse 101 appears on lead 92 to activate the address control circuitry. This start pulse may be applied from an external control circuit when an input address is ready to be applied to the input register, and advantageously the start pulse is applied simultaneously with the input address. The start pulse causes the gate control circuit 48 to enable gates in gate and inverter circuits 81 in the horizontal and vertical address control circuits over leads 89 and 90 during the initial beam position time. During this time the outputs of the photoelectron multipliers 31 behind the positioning slides 24 and 27 cause the electron beam to be accurately positioned at the desired spot on the surface 15 of the cathode ray tube corresponding to the position of the initial digit of the stored word that it is desired to read out. At the end of the time reserved in the cycle of operation for correction of positioning of the beam the gate control pulses on leads 89 and 90 are removed and scanning pulses applied over lead 93 to the read-and-scan generator, thereby activating it, causing appropriate deflection voltages to be applied to the deflection plates 13 and 14 so that the electron beam in effect scans each position of the digits in the desired stored words on the information storage plates 25, 26, 28, and 29. These scanning pulses are advantageously applied consecutively during the sixteen occurrences of the clock pulses for reading of the sixteen digits in each word in the specific embodiment of this invention herein disclosed. The scan pulses are also applied to activate each of the gates 32, 33, 34, and 35 connected to the photoelectron multipliers 31 behind the information storage slides 25, 26, 28, and 29 to allow passage of electrical pulses indicative of the stored information on each of these slides for each of the sixteen stored digits on each storage slide to the output register 40, as discussed further above. The output register 40 may comprise four distinct sixteen bit registers or a sixty-four bit register.

When the scanning of the stored information starts, the clock generator and gate control circuit 48 simultaneously applies shift pulses 103 to the horizontal address shift register circuit 56. In the specific embodiment described herein and as best seen in Fig. 5, only four digits are employed for the final address check, and therefore, as seen in Fig. 6, only four shift pulses for each coordinate need be applied. These pulses are first applied to the horizontal shift register 56 over lead 59 under control of the steering circuit 91, which itself is controlled by a steering control pulse applied thereto from the gate control circuit 48 over lead 88. As seen in Fig. 6, the steering control pulse 88 has a duration sufficient that the first four shift pulses 103 are applied to the horizontal shift register 56 and the second four shift pulses 103 are applied to the corresponding shift register in the vertical address control circuits. After the eight shift pulses 103, the clock generator 48 applies a transfer pulse over lead 60 which causes a transfer of the digits stored in the shift registers 56 to the input accumulators 55 in each of the vertical and horizontal address control circuits.

The transfer pulse over lead 60 is also applied to the gates associated with the shift register 56 in the horizontal address control circuit. If the stored information is being read out from the proper address, as determined by the final address check slide 30 and associated circuitry, as described further above, the transfer pulse applied over lead 60 will be transmitted through the shift register gates in the horizontal address control circuit and will be applied over lead 61 to the shift register gates in the vertical address control circuit. Again assuming proper address, the vertical shift register gates will also pass the pulse which will now be applied as an address check pulse over lead 62 to the clock generator and gate control circuit 48 to disable the next internal start pulse 106. Start pulse 106 is generated internally within the gate control circuit 48, and, absent the address check pulse over lead 62, start pulse 106 would cause the start of a new cycle of operation.

At the end of the read time, that is, after the clock pulses necessary to scan the desired words, store the information in the output register and verify its accuracy, a ready to read pulse is applied by the clock generator and gate control circuit 48 to the output register 40 over lead 63, thereby enabling that register and allowing its output to be applied to subsequent circuitry.

If the final address check determines that the information has not been read from the proper storage positions on the information storage slides, an address check pulse will not appear on lead 62, and the cycle of operation will be repeated on occurrence of the internal start pulse 106. It may be noted here that the internal start pulse 106, in addition to recycling the operation, operates gates to pass the input address digits from input register 18 to the shift register 56. The external start pulse 101 operates gates to pass the input register digits from input register 18 to the input accumulator 55. Thus on a recycle, no external start pulse is received, and the input register digits are transferred by action of the internal start pulse only to the shift register 56 as desired so as not to disturb the information already stored in the input accumulator 55.

Advantageously, the consecutive occurrences of the internal start pulse 106 may be counted so that after a number of repetitions of the reading cycle, a trouble indication is given and the storage circuit released for the next input address.

It is to be understood that the above-described arrangements are illustrative of the application of the principles of the invention. Numerous other arrangements may be devised by those skilled in the art without departing from the spirit and scope of the invention.

What is claimed is:

1. A storage system comprising an electron discharge device including a luminescent surface, means for projecting an electron beam against said surface to produce a spot of light thereon and means for deflecting said electron beam, information storage and positioning members positioned to receive light simultaneously from said spot on said surface, light responsive means for generating electrical impulses in response to light transmitted thereto through said storage and positioning members, means for applying deflection signals to said deflection means, and means applying signals to said last mentioned means from said light responsive means associated with said positioning members for correcting the incidence of said electron beam on said surface.

2. A storage system comprising a cathode ray tube including a luminescent surface, means for projecting an electron beam against said surface to produce a spot of light thereon, and means for deflecting said electron beam, a plurality of information storage and positioning members, means for focusing light rays from said spot simultaneously upon said members, light responsive means for generating electrical impulses in response to the light transmitted thereto through said members, means for applying deflection signals to said deflection means corresponding to the location of stored information desired to be read out, and means applying signals to said last mentioned means from said light responsive means associated with certain of said members for correcting the incidence of said electron beam on said surface.

3. A storage system comprising a cathode ray tube including a luminescent surface, means for projecting an electron beam against said surface to produce a spot of light on the area of incidence, and means for deflecting said electron beam, information storage members, positioning members, optical means for focusing the light from said area of incidence simultaneously upon said information storage members and said positioning members, light responsive means for generating electrical manifestations of the light transmitted thereto through said information storage members and said positioning members, means for applying deflection potentials to said deflection means depending upon the location of the stored information desired to be read out, and means applying signals to said last mentioned means from said light responsive means associated with said positioning members for correcting the incidence of said electron beam on said surface.

4. A storage system comprising an electron discharge device including a luminescent surface, means for projecting an electron beam against said surface, and means for deflecting said beam to a discrete area of said surface, a plurality of translucent members, certain of said members containing storage information in the form of opaque and nonopaque areas and certain other of said members having stored thereon positioning information in the form of opaque and nonopaque areas, optical means for obtaining a plurality of light rays from a single discrete area of said surface and focusing one of said light rays on each of said plurality of translucent members, photoelectric means for generating an electrical manifestation depending upon the amount of light transmitted thereto through said translucent members, means for applying deflecting potentials to said deflection means corresponding to the address location of the stored information desired to be read out, and means applying signals to said last mentioned means from said photoelectric means associated with said positioning members for correcting the incidence of said electron beam on said surface.

5. A storage system comprising a cathode ray tube including a luminescent surface and means for scanning an electron beam over said surface to produce spots of light at various points on said surface, said scanning means including means for selectively deflecting said electron beam, information storage members, address positioning members, optical means for focusing the light from one of said light spots simultaneously on said storage members and said positioning members, light responsive means for generating electrical impulses in response to the light transmitted thereto through said storage members and said positioning members, output circuit means connected to said light responsive means receiving light from said storage members, means for applying deflection signals to said deflection means to initially position the electron beam on said surface, and means for applying signals to said last mentioned means from said light responsive means receiving light from said positioning members for correcting the position of said electron beam on said surface.

6. A storage system comprising an electron discharge device having a luminescent surface and deflection means for projecting an electron beam against said surface, a plurality of translucent slide members positioned in front of said device, certain of said slide members having information stored thereon in the form of opaque and nonopaque areas and at least one other of said slide members having opaque and nonopaque positioning areas thereon, optical means for applying a light spot from said luminescent surface simultaneously to all of said slide members, light responsive means positioned behind said slide members for generating electrical impulses in response to the light transmitted thereto through said slide members, output registration means connected to said light responsive means behind said information slide members, means for applying deflection signals to said deflection means, and a feedback path connecting said deflection means to said light responsive means behind said positioning slide members, said feedback path including means applying correcting signals to said deflection means for correcting the position of said electron beam on said surface.

7. A storage system in accordance with claim 6, wherein said means applying correcting signals in said feedback path comprises means for comparing electrical signals from said light responsive means behind said positioning slide members with a reference signal, means amplifying the resultant signals from said comparing means, and means for inverting certain of said resultant signals in accordance with signals from said application means, said resultant signals being applied to said deflection means.

8. A storage system in accordance with claim 6 further comprising gating means connected between said output registration means and said light responsive means behind said information slide members, and means applying enabling signals to said gating means whereby said gating means pass signals from one of said light responsive means while blocking passage of signals from all others.

9. A storage system in accordance with claim 6 further comprising delay means connected between said output registration means and said light responsive means behind said information slide members, said delay means being arranged to pass signals from said light responsive means in a consecutive pattern.

10. A storage system in accordance with claim 6 further comprising a second feedback path connecting said deflection means to said light responsive means positioned behind another of said slide members other than said positioning members, means for scanning said beam over a portion of said surface and means in said second feedback path for applying correcting signals to said deflection means at the end of said scan.

11. A storage system in accordance with claim 10 wherein said second feedback path comprises means for registering an input address signal, means for comparing said input address signal and a signal from said light responsive means to which said second feedback path is connected, means for combining the result of said comparison with said input address signal in said registering means, and means for applying the summation of said signals to said deflection means.

12. A storage system comprising an electron discharge device including a luminescent surface, electron gun means for projecting an electron beam against said surface, and means for deflecting said beam to particular spots on said surface, a plurality of translucent members positioned adjacent said surface simultaneously to receive light therefrom, at least one of said members having information data stored thereon in the form of opaque and nonopaque areas and at least another of said members having positioning data stored thereon in the form of opaque and nonopaque areas, output means, means for applying electrical signals to said output means dependent on the passage of light through said information data translucent members, means for applying deflection signals to said deflection means to position said electron beam, and means including a feedback electrical path for also applying to said deflection means electrical signals dependent on the light passed through said positioning data translucent members.

13. A storage system in accordance with claim 12 wherein said feedback electrical path includes a differential amplifier, means applying electrical signals to said differential amplifier corresponding to the amount of light passed through said positioning data translucent members, and means applying a constant bias to said differential amplifier, the output of said differential amplifier representing in amplitude and sign the difference between said constant bias and said electrical signals corresponding to the amount of light passed through said positioning data translucent members.

14. A storage system in accordance with claim 13 wherein said feedback path further includes a summing amplifier connected to said deflection means, the output from said differential amplifier and said deflection signals being jointly applied to said summing amplifier.

15. A storage system comprising an electron discharge device including a luminescent surface, electron gun means for projecting an electron beam against said surface, and means for deflecting said beam to particular spots on said surface, an input register, means for applying to said input register address information corresponding to a particular discrete area of said surface, a plurality of translucent members positioned adjacent said surface simultaneously to receive light therefrom, at least one of said members having information data stored thereon in the form of opaque and nonopaque areas and at least another of said members having error detecting data stored thereon, means adjacent said translucent members and responsive to the passage of light therethrough for generating electrical signals, means for comparing the electrical signals from said last-mentioned means due to light passing through said error detecting translucent member with said address information in said input register, and means applying correction signals to said deflection means dependent on said comparison.

16. A storage system in accordance with claim 15 wherein said comparing means includes a shift register, means for applying digits of the address information in said input register simultaneously to said shift register, and means included in said deflection means for scanning said beam over said surface in accordance with scanning pulses, said scanning pulses being transmitted simultaneously to said shift register and serving to shift said digits of the address information in said shift register, the output of said shift register representing said address information in serial form.

17. A storage system in accordance with claim 16 wherein said comparing means further includes a serial subtractor, means applying said electrical signals generated in response to the passage of light through said error detecting member to said subtractor, and means applying the serial output of said shift register to said subtractor simultaneously with said last-mentioned electrical signals, the output of said serial subtractor representing the difference between said output of said shift register and said last-mentioned electrical signals, said output being applied serially to said shift register for registration of said output therein.

18. A storage system in accordance with claim 17 wherein said comparing means further includes an accumulator, means applying said digits of the address information in said input register to said accumulator, and means algebraically adding to said digits in said accumulator said output of said subtractor registered in said shift register, the output from said accumulator being applied to said deflection means.

19. A storage system in accordance with claim 18 further comprising an output register, and means for applying said electrical signals generated in response to the passage of light through said information storage members to said output register.

20. A storage system in accordance with claim 19 further comprising gating means connected between said output register and said light responsive means adjacent said information data storage members and means applying enabling signals to said gating means whereby said gating means pass signals from one of said information data storage members while blocking passage of signals from all others.

21. A storage system comprising an electron dischage device having a luminescent surface and means including vertical and horizontal deflection members for projecting an electron beam against said surface to produce spots of light thereon, a plurality of slides positioned in front of said device, certain of said slides having information stored thereon in the form of opaque and nonopaque spots, another of said slides having alternate vertical opaque and nonopaque bands thereon, and still another of said slides having alternate horizontal opaque and nonopaque bands thereon, means for focusing light rays from one of said light spots simultaneously on all of said slides, light responsive means for generating electrical impulses in response to the light transmitted thereto through said slides, a first feedback path connected from said light responsive means associated with said vertically banded slide to said horizontal deflection member, and a second feedback path connected from said light responsive means associated with said horizontally banded slide to said vertical deflection member.

22. In a system for storing binary digits as light and dark areas on a translucent medium, a cathode ray tube including a luminescent surface, electron gun means for projecting an electron beam against said surface to cause said surface to luminesce, deflection plates, means for applying deflection potentials to said plates to deflect said beam to a discrete area of said surface and for applying deflection potentials to said plates to scan said beam over said surface, a plurality of translucent slides positioned in front of said surface, certain of said slides having binary information stored thereon in the form of opaque and nonopaque spots and certain others of said slides having alternate opaque and nonopaque positioning bars thereon, a lens system positioned between said slides and said surface and arranged to focus light rays from said discrete area of said surface on corresponding areas of each of said slides, a plurality of photoelectron multiplier elements positioned adjacent to said slides and arranged to receive light passing through said slides, said photoelectron multiplier elements generating electrical impulses in accordance with the amount of light received therein, an output register, a plurality of gates connecting said register to those of said photoelectron multiplier elements receiving light through said slides having binary information stored thereon, circuit means connecting said deflection plates to those of said photoelectron multiplier elements receiving light through said slides having positioning bars thereon, and a source of fixed potential of a preestablished value, said circuit means including means for comparing the fixed value potential from said source with electrical signals received from said photoelectron multiplier elements connected through said circuit means to apply correction signals to said deflection plates for correcting the position of said electron beam on said surface.

23. A storage system in accordance with claim 22 wherein said circuit means further includes an inverter, the resultant signals from said comparing means being applied to said inverter, and means applying control signals to said inverting means whereby said inverting means selectively inverts said resultant signals from said comparing means.

24. A storage system in accordance with claim 23 wherein said circuit means further comprises an error integrating circuit connected between said inverting means and said deflection plates.

25. A system in accordance with claim 22 wherein said gataes include delay means to delay the passage of said electrical impulses arriving simultaneously thereat in varying amounts so as to pass all of said impulses consecutively.

26. In a system for storing binary digits as light and dark areas on a translucent medium, a cathode ray tube including a luminescent surface, electron gun means for projecting an electron beam against said surface to cause said surface to luminesce, and means for deflecting said beam to particular spots on said surface, an input register, means for applying to said input register address information corresponding to a particular discrete area of said surface, a plurality of translucent slides positioned in front of said surface, certain of said slides having information data and error detection data stored thereon in the form of opaque and nonopaque spots, a lens system positioned between said slides and said surface and arranged to focus light rays from said discrete area of said surface on corresponding areas of each of said slides, a plurality of photoelectron multiplier elements positioned adjacent said slides and arranged to receive light passing through said slides, said photoelectron multiplier elements generating electrical impulses in accordance with the amount of light received thereon, circuit means connecting said deflecting means to said photoelectron multiplier elements, said circuit means including means for comparing said address information in said input register with electrical signals from said photoelectron multiplier elements, and means applying correction signals to said deflection means dependent on said comparison.

27. A storage system in accordance with claim 26 wherein said comparing means includes a shift register, means applying digits of the address information in said input register simultaneously to said shift register, means included in said deflection means for scanning said beam over said surface in accordance with scanning pulses, said scanning pulses being transmitted simultaneously to said shift register and serving to shift said digits of the address information in said shift register, the output of said shift register representing said address information in serial form.

28. A storage system in accordance with claim 27 wherein said comparing means further includes a serial subtractor, means applying said electrical signals from said photoelectron multiplier elements to said subtractor, and means applying the serial output of said shift register to said subtractor simultaneously with said electrical signals from said photoelectron multiplier elements, the output of said serial subtractor representing the difference between said output of said shift register and said electrical signals from said photoelectron multiplier elements.

29. A storage system in accordance with claim 28 wherein said comparing means further includes an accumulator, means applying said digits of the address information in said input register to said accumulator, and means algebraically adding to said digits in said accumulator said output of said subtractor registered in said shift register, the output from said accumulator being applied to said deflection means.

30. A storage system in accordance with claim 29 further comprising an output register and means for applying said electrical signals generated in response to the passage of light through said information storage members to said output register.

31. A storage system in accordance with claim 30 further comprising delay means connected between said output registration means and said photoelectron multiplier elements, said delay means being arranged to pass signals from said photoelectron multiplier elements in a consecutive pattern.

32. An electrical circuit comprising a cathode ray tube having a luminescent surface, means for projecting an electron beam against said surface and means for deflecting said beam, and means for correcting the deflection of said beam, said correcting means including a positioning member positioned to receive light from said surface, light responsive means for generating electrical signals in response to light transmitted thereto from said surface through said positioning member, and means for applying correction signals to said deflection means dependent on said electrical signals.

33. An electrical circuit in accordance with claim 32 wherein said last-mentioned means comprises means for comparing said electrical signals with a reference signal.

34. An electrical circuit comprising an electron discharge device including a luminescent surface, means for projecting an electron beam against said surface and means for deflecting said beam to particular spots on said surface, a beam positioning member adjacent said surface to receive light from said spots, means for applying deflection signals to said deflection means to position said electron beam, and means including a feedback electrical path for also applying to said deflection means electrical signals dependent on the light transmitted through said beam positioning member to correct the positioning of said beam on said luminescent surface.

35. An electrical circuit in accordance with claim 34 wherein said feedback path also includes means for comparing said electrical signals with a constant signal, the output of said comparing means representing in amplitude and sign the positioning error of the electron beam.

No references cited.